United States Patent [19]
Bierman et al.

[11] 3,833,458
[45] Sept. 3, 1974

[54] METAL-POLYMER COMPOSITES AND METHODS FOR THEIR PREPARATION
[75] Inventors: Clarence R. Bierman; John D. Welks, both of Barrington, Ill.
[73] Assignee: M & T Chemicals Inc., Greenwich, Conn.
[22] Filed: Jan. 3, 1972
[21] Appl. No.: 215,115

[52] U.S. Cl.................. 161/216, 156/82, 156/272, 156/307, 156/309, 156/313, 156/332, 161/217, 161/218, 161/253, 161/254
[51] Int. Cl......................... B32b 15/04, C09j 5/00
[58] Field of Search .......... 161/216, 218, 217, 253, 161/254; 117/93, 1 CD; 156/82, 272, 307, 309, 313, 332

[56] References Cited
UNITED STATES PATENTS

| | | | |
|---|---|---|---|
| 2,581,926 | 1/1952 | Groten et al..................... | 161/218 X |
| 2,659,706 | 11/1953 | Fisk et al. ........................ | 161/218 X |
| 2,684,351 | 7/1954 | Williams.......................... | 161/216 X |
| 2,872,366 | 2/1959 | Kiernan et al................... | 161/218 X |
| 2,994,632 | 8/1961 | Brown et al. ....................... | 161/218 |
| 3,135,679 | 6/1964 | Rothacker............... | 117/93.1 CD X |
| 3,719,551 | 3/1973 | Radtke et al. .................. | 161/218 X |

*Primary Examiner*—George F. Lesmes
*Assistant Examiner*—Lorraine T. Kendell
*Attorney, Agent, or Firm*—Kenneth G. Wheeless; Robert P. Auber; Robert Spector

[57] ABSTRACT

Strong durable bonds are formed between metals and vinyl chloride-containing polymers by maintaining at a surface of the metal a layer of polymer that contains pendant carboxylic acid

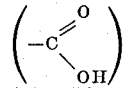

groups. One surface of the polymer layer has been modified by oxidation or chemical etching agents. Between the modified surface of the polymer layer and the vinyl chloride-containing polymer is an adhesive comprising a mixture of a natural or synthetic rubber and a phenolaldehyde resin. Heating the composite above 120°C. for a short period of time yields a unitary bonded structure.

6 Claims, No Drawings

METAL-POLYMER COMPOSITES AND METHODS FOR THEIR PREPARATION

BACKGROUND

This invention relates to a method for adhesively bonding metals to vinyl chloride-containing polymers. This invention further relates to novel composite structures comprising a metallic layer and a vinyl chloride-containing polymer which are held together without the need for mechanical fastening devices such as bolts or clamps.

The relatively low cost and excellent tensile properties of poly(vinyl chloride) and copolymers of vinyl chloride make these materials desirable for use in protecting exposed metal surfaces, e.g., bumpers of automobiles, from damage such as that resulting from low speed impact.

Heretofore, it has been difficult to form cohesive bonds between metal surfaces and vinyl chloride-containing polymers. A wide variety of adhesives have been utilized with at most minimal success. The bonds which do form are not sufficiently strong to withstand the stresses and temperature changes encountered during many end use applications of the resulting composites.

Polymers containing pendant carboxylic acid groups, e.g., copolymers of acrylic acid with ethylene or acrylic acid esters, will from strong bonds to many metals; however, the polymers will not adhere to surfaces of vinyl chloride polymers even following modification of either of the mating surfaces by the use of oxidizing agents, e.g., ozone or chemical etchants.

It has now been found that mixtures of certain rubbers with phenol-aldehyde polymers can be employed to adhesively bond modified polymers containing pendant carboxylic acid groups to homopolymers and copolymers of vinyl chloride.

SUMMARY OF THE INVENTION

This invention relates to a method for adhesively bonding a vinyl chloride-containing polymer to a metallic surface said method comprising:

1. maintaining at the metallic surface a layer of a polymer containing at least 3 percent by weight of repeating units derived from one or more ethylenically unsaturated carboxylic acids containing up to 12 carbon atoms, wherein the carboxylic acid is present as a pendant group, said layer of polymer having at least one surface which has been modified by treatment with an oxidizing or etching agent;

2. maintaining an adhesive composition at the interface between the modified polymer surface and said vinyl chloride-containing polymer, the adhesive composition comprising
   a. between 10 and 50 percent by weight of a synthetic rubber containing at least 20 percent by weight of acrylonitrile and
   b. between 50 and 90 percent by weight of a cross-linkable phenol-aldehyde resin;

3. heating the resultant composite at a temperature above about 120°C. for a period of time sufficient to form a unitary, bonded structure.

DETAILED DESCRIPTION OF THE INVENTION

A. The Metallic Surface

Polymers containing repeating units derived from acrylic acid or other unsaturated acids wherein the carboxylic acid radicals are present as pendant groups on the polymer will adhere to a variety of ferrous and nonferrous metals including iron, nickel, chromium, aluminum and tin. Any of these materials, either alone or in combination as alloys, can be used as the metallic surface to which the vinyl chloride polymer will be bonded using the method of this invention. Chromium plated steel is employed for automobile bumpers and is a preferred material for use in the present invention.

B. The Carboxylic Acid-Containing Polymer

The metallic surface is placed in contact with a polymer wherein 3 percent by weight or more of the repeating units are derived from ethylenically unsaturated acids. At least a portion of the repeating units of the resultant polymer contain pendant carboxylic acid residues and correspond to the general formula

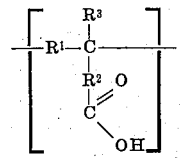

wherein $R^1$ represents a divalent hydrocarbon radical, $R^2$ represents a single bond or a hydrocarbon radical, and $R^3$ represents a hydrogen atom or a methyl radical. The combination of $R^1$ and $R^2$ contains up to 11 carbon atoms. Preferred polymers for use in this invention are copolymers of ethylene and acrylic acid which contain between 3 and 18 percent by weight of acrylic acid. The polymer is conveniently employed in the form of a film to ensure the formation of strong bonds between the carboxylic acid-containing polymer and the adjacent adhesive layer described in the following section of this application. The surface of the polymer layer on which the adhesive is applied has been modified by treatment with a flame, corona discharge or chemical etching agent. Suitable etching agents include a mixture of concentrated sulfuric and chromic acids, optionally in combination with phosphoric acid. Alternatively, the modification can be accomplished by exposing a surface of the polymer layer to a flame or a corona discharge, both of which are believed to cause oxidation of at least a portion of the polymer on the surface being treated.

C. The Rubber/Phenol-Aldehyde Resin Adhesive

Bonding of the modified surface of the carboxylic acid-containing polymer to the vinyl chloride-containing polymer is effected using an adhesive which comprises a natural or synthetic rubber in combination with a cross-linkable phenol-aldehyde resin.

Preferred rubbers include copolymers of acrylonitrile and butadiene containing 20 weight percent or more of acrylonitrile. For the purpose of this invention, it is convenient to use the rubber as solid lumps or crumbs in contrast to employing solutions or emulsions which are useful in other applications. The rubber exhibits a Mooney viscosity of between 20 and 95, preferably between 50 and 60 at a temperature of 100°C. The definition of Mooney viscosity and the procedure for determining this value are described in ASTM (American Society for Testing of Materials) test procedure No. D-1646.

The second component of the adhesive is a crosslinkable phenol-aldehyde resin which acts as the crosslinking agent for the rubber and improves the tensile properties of the adhesive. The resin is in the thermoplastic form and preferably exhibits a melting point of between 60° and 70°C. The resin may contain various known modifiers and extenders, for example, unsaturated oils such as cashew nut shell oil, linseed oil, etc.

The rubber and phenol-aldehyde resin are blended to form a homogeneous composition using known methods and equipment, e.g., a two-roll rubber mill. The composition may contain various known additives such as pigments, stabilizers and fillers, in addition to antioxidants for the rubber component.

D. The Vinyl Chloride Polymer

The fourth member of the structural composite prepared using the method of this invention is a solid polymer wherein the major or sole repeating unit is derived from vinyl chloride. For those applications in which the polymer will serve to protect the metal surface of the composite from damage resulting from impact, the polymer should contain more than 50 weight percent of repeating units derived from vinyl chloride, the remaining units being derived from ethylenically unsaturated monomers which copolymerize with vinyl chloride. The molecular weight of the polymer should exceed about 20,000. The vinyl chloride polymer may contain various known additives such as pigments and stabilizers in addition to extenders such as carbon black.

E. Preparation of the Structural Composites

A preferred method for utilizing the process of this invention comprises applying the adhesive component as a solution or dispersion in a suitable liquid vehicle to the modified surface of a film formed from the carboxylic acid-containing polymer described in Section B hereinbefore. The opposite or unmodified surface of the film is placed against the metal surface and the adhesive coating is placed in contact with the vinyl chloride-containing polymer. The resultant composite is then heated at a temperature of 120°C. or higher for a period of time sufficient to form a unitary bonded structure. Temperatures between about 120° - 206°C. are preferred. It may be desirable to employ weights, clamps, or other suitable devices for the purpose of ensuring good contact between the several members of the composite during the heating cycle.

The following example is intended to illustrate a preferred embodiment of this invention and should not be interpreted as limiting the scope thereof either with regard to choice of materials or the specific procedure employed for preparing and bonding the composite.

The adhesive component was prepared by blending together the following ingredients on a heated two-roll rubber mill until a homogeneous composition was obtained:

150 grams of copolymer of acrylonitrile and butadiene containing 33.5 percent by weight of repeating units derived from acrylontrile;
(the polymer exhibited a Mooney viscosity of 52 at a temperature of 100°C., and is available from the Goodrich Company as Hycar 1052);
110 grams of a cashew nut shell oil-modified phenol-formaldehyde resin containing hexamethylene tetramine (available as Akrochem P87 from the Akron Chemical Company);
35 grams of pigment grade titanium dioxide;
30 grams of a kaolin type clay available under the trade name Buca Clay;
1.5 grams of N,N'-di-$\beta$-naphthyl-p-phenylene diamine.

The adhesive was dissolved in methyl ethyl ketone and a portion of the solution was coated as a 0.0005 inch (0.0013 cm.)-thick layer on the modified surface of a film prepared from an ethylene-acrylic acid copolymer. The coating was performed using a wire-wound drawbar. Prior to being coated, one surface of the film had been modified by exposing it to a corona discharge. The uncoated surface of the film was placed against a chromium plated steel slab, and a 1 inch (2.5 cm.)-wide strip of 0.156 inch-thick molded poly(vinyl chloride) formulation was placed on the layer of adhesive. The formulation contained 66 percent by weight of poly(vinyl chloride) resin, 10 percent of a commercial polyester type plasticizer, 3 percent carbon black and 3 percent of an epoxide resin derived from the diglycidyl ether of bisphenol A.

A thermocouple was inserted at the interface between the chromium plated slab and the arcylic acid-ethylene copolymer. The composite was oriented with the layers in a substantially horizontal position and the metal slab as the lowest layer. A 10 pound weight was placed on top of the poly(vinyl chloride) component, after which the composite was heated in an oven until the thermocouple indicated a temperature of 120°C., which required about 30 seconds of heating. Heating was continued for an additional 60 seconds during which time the temperature increased to 130°C. After cooling to ambient temperature, a peel test indicated that strong bonds had formed between all components of the composite.

The peel test was conducted by positioning the composite between the jaws of a Instron tensile tester. The chromium plated slab and a poly(vinyl chloride) strip were separately secuted to the two jaws of the tester and a force was applied to the composite by moving the jaws in a direction away from one another and substantially perpendicular with respect to the planes defined by the layers of the composite. Ten pounds of force were required to cause separation of the poly(vinyl chloride) strip from the metal slab using a jaw separation rate of one inch per minute. A force of 18 pounds was required using a jaw separation rate of 10 inches per minute.

Although this invention has been illustrated by reference to specific embodiments, modifications thereof which are clearly within the scope of the invention will be apparent to those skilled in the art.

What is claimed is:

1. A bonded structural composite comprising the following sequence of components:
   1. a metallic surface
   2. a polymeric layer wherein at least 3 percent by weight of the repeating units are derived from an ethylenically unsaturated carboxylic acid containing up to 12 carbon atoms and the carboxylic acid groups are present as pendant groups on the polymer, said polymeric layer having at least one surface which has been modified by treatment with a flame, corona discharge or chemical etching agent 3. an adhesive composition in contact with the modified surface of said polymeric layer, said adhesive composition comprising 10 to 50 percent by weight of a synthetic diene rubber, containing at least 20 percent by weight of acrylonitrile, and between 50 and 90 percent by weight of a cross-linkable phenol-aldehyde resin
4. a polymer wherein at least 50 percent of the repeating units are derived from vinyl chloride.

2. A bonded composite as described in claim 1 wherein the metallic surface is chromium.

3. A bonded composite as described in claim 1 wherein the ethylenically unsaturated acid is acrylic acid.

4. A bonded composite as described in claim 1 wherein the layer of polymer containing an ethylenically unsaturated acid has been modified by treatment with an electrical corona discharge.

5. A bonded composite as described in claim 1 wherein the phenol-aldehyde resin is a phenol-formaldehyde resin modified with an ethylenically unsaturated oil.

6. A bonded composite as described in claim 1 wherein the rubber is a butadiene-acrylonitrile copolymer containing at least 20 percent by weight of repeating units derived from acrylontrile.

* * * * *